Figure 1:
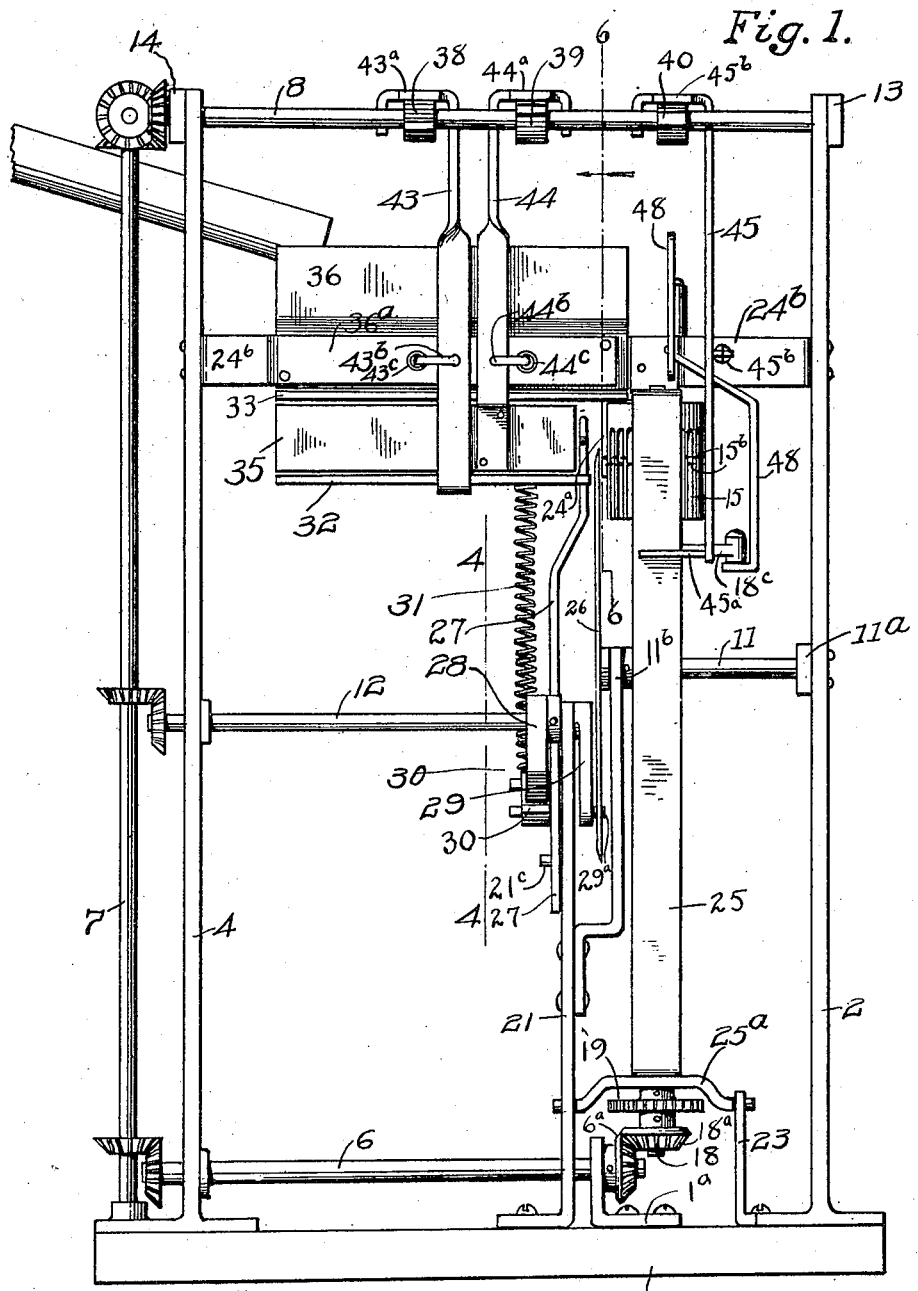

F. HEATH.
SARDINE BEHEADING AND ENTRAILS REMOVING APPARATUS.
APPLICATION FILED FEB. 13, 1919.

1,402,421.

Patented Jan. 3, 1922.
3 SHEETS—SHEET 1.

INVENTOR.
Frank Heath
BY A. B. Bowman
ATTORNEY

F. HEATH.
SARDINE BEHEADING AND ENTRAILS REMOVING APPARATUS.
APPLICATION FILED FEB. 13, 1919.

1,402,421.

Patented Jan. 3, 1922.
3 SHEETS—SHEET 2.

INVENTOR.
Frank Heath
BY A. B. Bowman
ATTORNEY

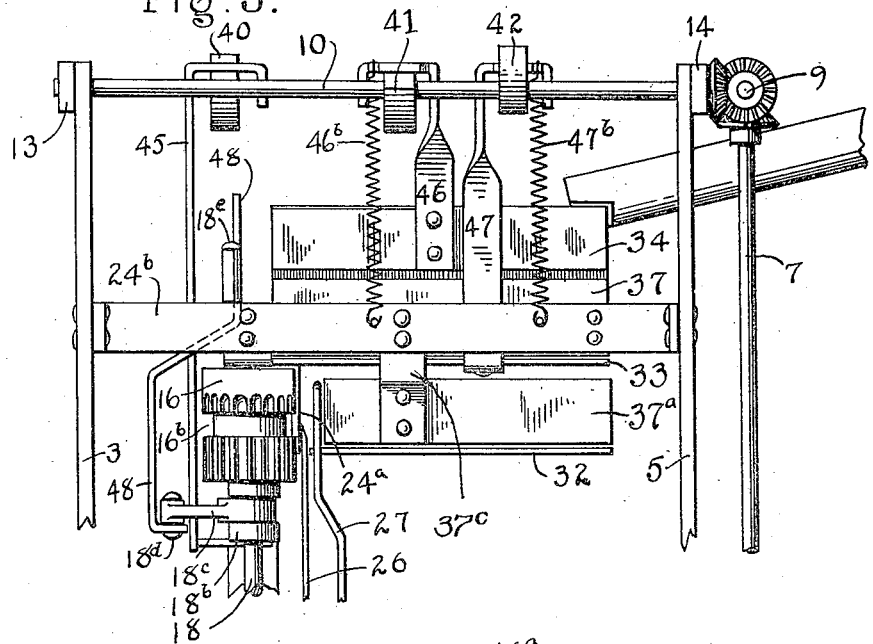
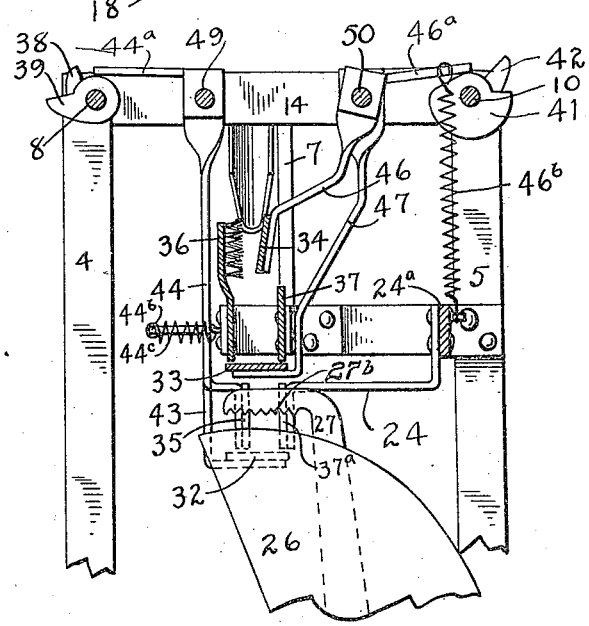

UNITED STATES PATENT OFFICE.

FRANK HEATH, OF NATIONAL CITY, CALIFORNIA.

SARDINE-BEHEADING AND ENTRAILS-REMOVING APPARATUS.

1,402,421.   Specification of Letters Patent.   Patented Jan. 3, 1922.

Application filed February 13, 1919. Serial No. 276,818.

*To all whom it may concern:*

Be it known that I, FRANK HEATH, a citizen of the United States, residing at National City, in the county of San Diego and State of California, have invented certain new and useful Improvements in Sardine-Beheading and Entrails-Removing Apparatus, of which the following is a specification.

My invention relates to an apparatus to be used for beheading and removing the entrails of sardines before canning and the objects of my invention are, first, to provide an improved apparatus for beheading and removing the entrails of sardines over my application for sardine preparing apparatus, filed in the United States Patent Office January 21, 1918, Serial Number 212,874, the apparatus now being applied for taking the sardines after they have been selected and conducted on their backs into position to be operated on by the hereinafter described machine; second, to provide an apparatus of this class in which each sardine is positioned and securely held while being beheaded and the head and entrails are moved away from the sardine body and the body dropped out of the way, all of which is performed automatically; third, to provide an apparatus of this class in which one sardine follows a preceding one and it is placed in a separate compartment to be beheaded and its entrails removed in proper sequence automatically; fourth, to provide an apparatus of this class in which the sardine is properly placed so that the knife cuts each sardine at a certain position thus eliminating waste; fifth, to provide means in connection with a rotating beheading knife for supporting the sardine against the action of the knife for providing a shearing structure; sixth, to provide a rotating knife with means for providing increased speed of the revolution of the knife during its cutting period, and seventh, to provide an apparatus for the purposes described which is simple and economical of construction, automatic in its operation and which will not readily deteriorate or get out of order.

Figure 2:
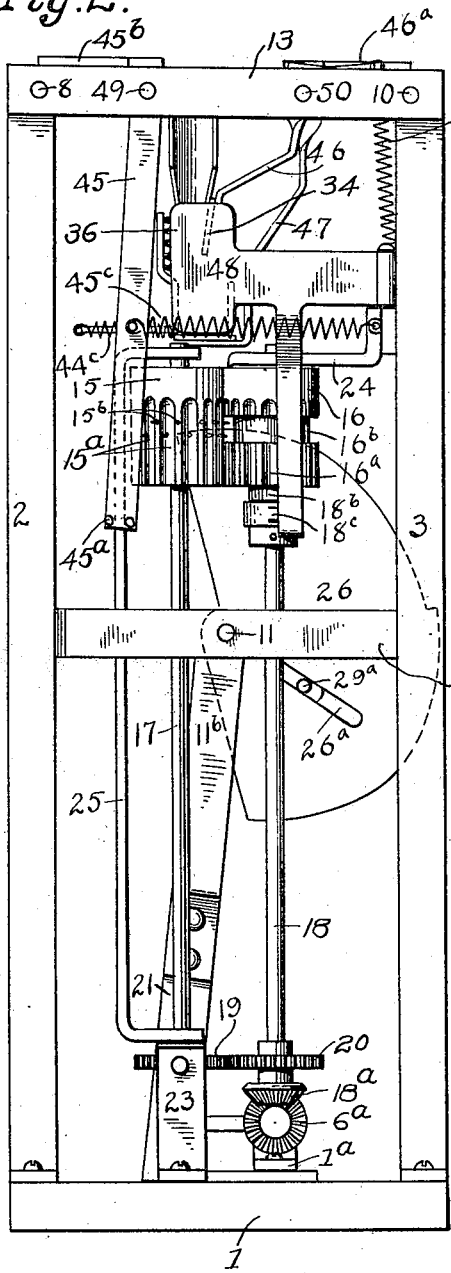
Figure 3:
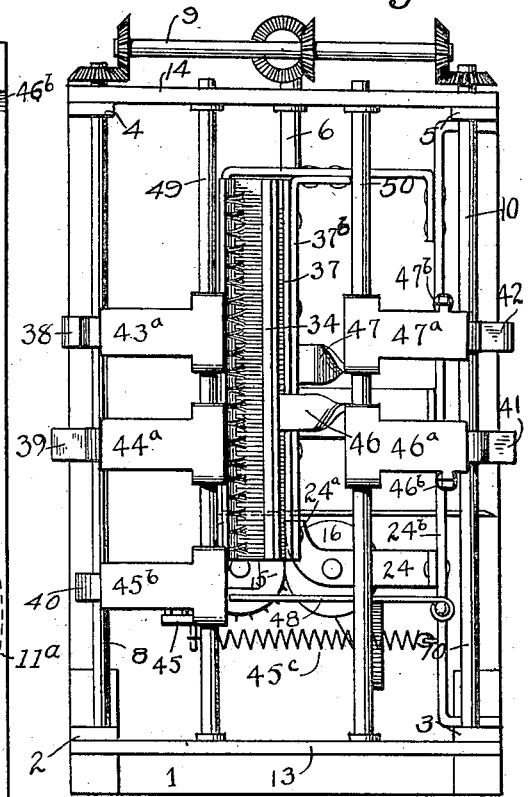
Figure 4:
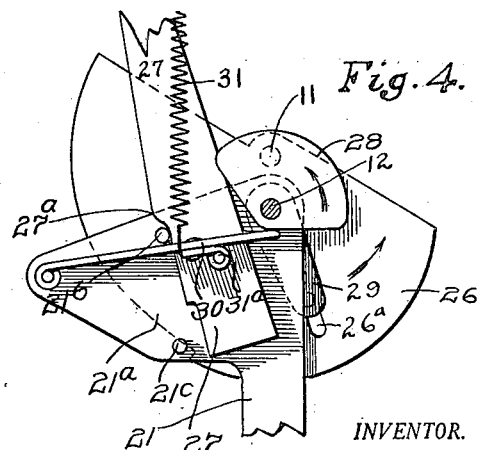

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of the application in which:

Figure 1 is a side elevational view of the apparatus; Fig. 2 is an end elevational view thereof; Fig. 3 is a top or plan view thereof; Fig. 4 is a sectional view through 4—4 of Fig. 1; Fig. 5 is a fragmentary side elevational view opposite from that of Fig. 1 and Fig. 6 is a sectional view through 6—6 of Fig. 1.

Similar characters of reference refer to similar parts and portions throughout the several views of the drawings.

The base 1, perpendicular supports 2, 3, 4, and 5, shafts 6, 7, 8, 9, 10, 11 and 12, transverse bars 13 and 14, rollers 15, and 16, roller shafts 17 and 18, spur gears 19 and 20, supports 21 and 23, stationary roller support 24, shiftable roller support 25, beheading knife 26, sardine supporting device 27, cam 28, knife operating crank 29, latch 30, latch spring 31, trap 32, side trap 33, movable side 34, movable side 35, stationary side 36, stationary side 37, stationary side 37$^a$, cams 38, 39, 40, 41, and 42, bell cranks 43, 44, 45, 46, and 47, and fish positioning device 48, constitute the principal parts of my apparatus.

The base 1 is of suitable shape to which the supports 2, 3, 4, and 5 are secured and these supports are connected at their upper ends by means of cross bars 13, and 14 and by longitudinal shafts 49 and 50 which are secured at their opposite ends in these cross bars 13 and 14. The shaft 11 is supported in a cross bar at one end 11$^a$ and its other end is supported by a support 11$^b$ which is secured to the support 21. Secured to the inner end of the shaft 11 is the beheading knife 26 which is shaped as shown best in Figs. 1, 2 and 4 of the drawings, its outer edge being eccentric with the shaft 12 so that in its revolution the cutting edge increases as the knife proceeds. Mounted on this base member 1 are also two supports 21 and 23 and in the supports 21 and 23 is pivotally mounted a cross support 25$^a$ to which is rigidly secured the support 25. This support 25 is yoke shaped, being provided with a right angled bend at each end, and journaled in these right angled bends is the shaft 17. The lower end of the shaft 17 extends downwardly below the pivotal support 25$^a$ and on the lower end is secured a spur gear 19 which intermeshes with another spur gear 20 secured to a shaft 18 which is normally parallel with the shaft 17 and extends upwardly and upon the upper ends of these shafts 17 and 18 are secured the rollers 15 and 16. The lower end of the shaft 18 is journaled in a bearing 25$^a$ secured on the base 1 and it is provided with a bevel gear 18$^a$ secured thereto which meshes with another bevel gear 6$^a$ secured on the shaft 6 and said shaft 6 is the main drive shaft.

Thus it will be seen that the shafts 17 and 18 are revolved through the gears 19 and 20, bevel gear 18$^a$, bevel gear 6$^a$ and main drive shaft 6.

The rollers 15 and 16 secured on the upper end of the shafts 17 and 18 are provided with grooves 15$^a$ and 16$^a$ extending longitudinally along said rollers but leaving a portion at the upper end of each roller without grooves. The roller 15 is provided with a plurality of pins 15$^b$ projecting from said roll around near the middle and the roll 16 is provided with a groove 16$^b$; these grooves and pins are for the purpose of facilitating the movement of the head and entrails and prevent wringing the contents backwardly.

It will be here noted that the roller 15 together with the shaft upon which it is mounted and the yoke support 25 are adapted to move away from the roll 16 and there is provided a lever 45 with two extended lugs 45$^a$ which extend on opposite sides of the member 25 and its upper end is pivoted on the shaft 49 and it is provided with an extended member 45$^b$ which engages a cam 40 on the shaft 8 for operating the bell crank lever which in turn intermittently moves the roller 15 into and out of engagement with the roller 16. There is provided a spring 45$^c$ adapted to tend to hold the roller 15 in engagement with the roller 16 at all times. The support 24 for the upper end of the shaft 18 is provided with a downwardly extending portion 24$^a$ which is adapted to engage one side of the knife and provide a support for the neck of the sardine and a shearing member for the knife 26. This support 24 is secured on a longitudinal bar 24$^b$ which extends across and unites the members 3 and 5. Mounted on the shaft 49 is the lever 44 which is a bell crank lever provided at its upper end with an extension 44$^a$ which engages the cam 39 on the shaft 8 and this lever 44 extends downwardly and is provided with a lug 44$^b$ which extends outwardly and to the end is attached a tension spring 44$^c$ which is secured to a reinforcing bar 36$^a$ which extends to and is supported on the bar 24$^b$. On the lower end of this lever 44 is secured a side shifting member 35 which is adapted to engage the side of the sardine when it is about to be beheaded, and holds it in position.

On this same shaft 49 is pivotally mounted another bell crank lever 43 which is provided with an extended member 43$^a$ which engages the cam 38 on the shaft 8 and it is provided with an outwardly extending lug 43$^b$ to the extended end of which is attached a tension spring 43$^c$ which is also secured to the bar 36$^a$ and mounted on the lower end of this lever 43 is the trap 32 which is a bar extending across the lower side of the sardine support and is adapted to be moved out by the cam 38 for dropping the sardine after it has been beheaded in its proper sequence.

The shaft 18 is provided with an eccentric 18$^b$ thereon forming a crank upon which is journaled the arm member 18$^c$ which extends outwardly and is provided in its outwardly extended end with a pin 18$^d$ and on said pin is journaled the member 48, the one end of which is pivoted on a supoprt 18$^e$ which is secured to the support 24$^b$. The upper free end of this member 48 is enlarged and provided with an inwardly extending lug which engages the sardine head and this structure is for the purpose of gradually pressing the sardine on the head and moving it to a certain position with the revolution of the shaft 18. The knife 26 is actuated by the arm 29 which is secured on the end of the shaft 12 by means of a pin 29$^a$ secured thereto which engages a slot 26$^a$ in the knife 26 and this pin moves in said slot with the revolution of the crank 29 because of the different positions of the pivot of the crank arm 29 with the knife 26 thus providing for greater speed of the revolution of the knife during a portion of its revolution. This shaft 12 is journaled in the support 21 which is provided with an extended portion 21$^a$ and with two pins 21$^b$ and 21$^c$ shown best in Fig. 4 of the drawings. Pivotally mounted on the portion 21$^a$ of the support 21 is a bar 30 which bar is adapted to be engaged by the cam member 28 and depressed thereby with the revolution of the said cam member and this bar 30 is provided with a spring 31. The pin 31$^a$ passes through the bar 30 and forms a pivotal support for said bar and the inner end of the pin 31$^a$ is rigidly secured to the sardine engaging member 27 at its lower end. This sardine engaging member 27 is provided with a portion 27$^a$ which engages the pin 21$^b$ and shifts the upper end of this sardine engaging member 27 forwardly with its downward movement caused by the depression of the bar 30 and it is supported at its lower end with the pin 21$^c$ for regulating its movement, thus the cam 28 in its revolution operates the sardine engaging member 27 through the bar 30 and it is held upwardly by means of the spring 31 into engagement with the pin 21ᵇ except when actuated by the cam 28. The upper end of this sardine engaging member 27 is turned at a right angle and provided with teeth 27ᵇ for engaging the sardine.

The member 34 is moved inwardly and outwardly by means of the lever 46 to which it is secured. This lever is pivotally mounted on the shaft 50 and is provided with an extended portion 46ᵃ which extends to and engages a cam 41 secured to the shaft 10 and said member 46ᵃ is held in engaging position with the cam 41 by means of a tension spring 46ᵇ. The members 37 and 37ᵃ are rigid members and the member 37 is supported by a support 37ᵇ which extends outwardly and is secured to the bar 24ᵇ, and the member 37ᵃ is supported by the member 37ᶜ which extends from the member 24ᵃ and mounted between these members 37 and 37ᵃ is the trap member 33 which is secured to the lever 47 which is a bell crank lever pivotally mounted upon the shaft 50 and provided with an extended portion 47ᵃ which engages a cam 42 secured on the shaft 10 and said member 47ᵃ is held in position in engagement with said cam 42 by means of the spring 47ᵇ. These shafts 8 and 10 are revolved by means of pivotal gears on said shafts engaging pivotal gears on another shaft 9 and this shaft 9 is revolved by means of a vertical shaft 7 which is revolved by means of pivotal gears securing it with the main drive shaft 6. The shaft 12 is also actuated by a pivotal gear thereon engaging with a pivotal gear on the shaft 7 the shafts being provided with the proper sized gears to provide the proper speeds for the various shafts.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

The operation of the apparatus is as follows:

The sardines gravitate head foremost from a chute into a collecting box and are properly positioned therein by means of the positioning device 48 and said collecting box is provided with laterally moving side plates properly timed relatively with the other operating mechanism so that the sardines are dropped, one at a time by means of the trap 33, which is also properly timed, into a beheading box. This beheading box is shorter than the collecting box so that the sardine's head overhangs said beheading device after which the sardine is engaged at the neck by the member 27 near the place where its head is severed by properly timed actuating mechanism and the beheading knife immediately following severs the head from the body while held by the member 27. At the time the sardine drops from the collecting box to the beheading box, the shiftable roller 15 moves outwardly by means of the lever 45 actuated by the cam 40, thus permitting the sardine's head to drop into position after which it moves back again and engages the head of the sardine, the rollers 15 and 16 revolving rupture the remaining portion not severed by the knife, carrying the head outwardly between the rollers together with the entrails which are still connected to the head. After which the trap 32 is shifted by means of the lever 43 in engagement with the cam 38 and the sardine, less its head and entrails, is dropped out of the way and after which the same operation again takes place in its proper sequence, it being noted that the several operating mechanisms are properly timed for the action in their proper sequence as hereinbefore described.

Having thus described my invention what I claim as new and desire to secure by Letters Patent is:

1. An apparatus of the class described, including a chute, a receptacle provided with movable sides adapted to press against the sides of the sardine positioned to receive the sardines from said chute, a revoluble roll with a fixed axis contiguous to one end of said receptacle, a shiftable roll member shiftable relatively thereto, a beheading knife co-operatively connected with said shiftable roll, means for shifting the movable sides of said receptacle and means for shifting said shiftable roll member, all operative in their proper sequence.

2. An apparatus of the class described, including a chute, a receptacle provided with movable sides adapted to press against the sides of the sardine positioned to receive the sardines from said chute, a revoluble roll member contiguous to one end of said receptacle, a shiftable roll member shiftable relatively thereto, a beheading knife co-operatively connected with said shiftable roll, means for shifting the movable sides of said receptacle, means for shifting said shiftable roll member and means for revolving said beheading knife, all operative in their proper sequence.

3. An apparatus of the class described, including a chute, a receptacle provided with movable sides adapted to press against the sides of the sardine positioned to receive the sardines from said chute, a revoluble member provided with a fixed axis, a shiftable roll member shiftable relatively thereto, a beheading knife co-operatively connected with said shiftable roll member, means for shifting said movable sides and means co-operatively connected with said beheading knife for engaging the sardine with each revolution of the knife for holding it in a certain relative position to the knife.

4. An apparatus of the class described, including a chute, a receptacle provided with movable sides adapted to press against the sides of the sardine positioned to receive the sardines from said chute, a roll member with a fixed axis, another roll member with a shiftable axis, a beheading knife co-operatively connected therewith, means for shifting said movable sides, means for shifting said roll with a shiftable axis and means co-operatively connected with said beheading knife for engaging the sardine with each revolution of the knife for holding said sardine in a certain relative position to the knife, all operative in their proper sequence.

5. An apparatus of the class described, including a sardine receiving receptacle provided with shiftable side sections adapted to press against the sides of the sardine, means for separately shifting said sections and a beheading knife positioned to engage the sardine's neck for severing the head while the sardine is positioned in said receptacle.

6. An apparatus of the class described, including a sardine receiving receptacle, a beheading knife adapted to pass in close proximity with one end of said receptacle and engage the neck of the sardine in said receptacle, a pair of roll members adapted to engage the head of the sardine and remove it together with the entrails from the sardine, means for engaging the head of the sardine for properly positioning it relatively to the knife and means for shifting the bottom of said receptacle for discharging the sardine after it is beheaded, all operated in their proper sequence.

In testimony whereof, I have hereunto set my hand at San Diego, California, this 6th day of January, 1919.

FRANK HEATH.